United States Patent Office 3,740,404
Patented June 19, 1973

3,740,404
PIPERIDINOMETHYLENEDIHYDRO-
CARBAZOLONES
Ruddy Littell, Rivervale, and George Rodger Allen, Jr.,
Old Tappan, N.J., assignors to American Cyanamid
Company, Stamford, Conn.
No Drawing. Continuation-in-part of application Ser. No.
823,513, May 9, 1969, now Patent No. 3,634,420. This
application July 9, 1971, Ser. No. 161,267
Int. Cl. C07d 29/26
U.S. Cl. 260—293.61                                8 Claims

ABSTRACT OF THE DISCLOSURE

The preparation of substituted piperidinomethylenedihydrocarbazolones by reacting a 2,3-dihydrocarbazolone with paraformaldehyde and a piperidine is described. The products are useful for their central nervous system activity as tranquilizers.

This application is a continuation-in-part of our application Ser. No. 823,513, filed May 9, 1969, now U.S. Pat. 3,634,420.

SUMMARY OF THE INVENTION

This invention relates to novel substituted piperidinomethylenedihydrocarbazolones of the formula:

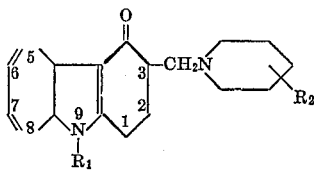

wherein $R_1$ is selected from the group consisting of hydrogen and lower alkyl $(C_1-C_4)$; $R_2$ is selected from the group consisting of hydrogen, lower alkyl $(C_1-C_4)$ and phenyl.

The compounds of this invention are, in general, crystalline solids having characteristic melting points and absorption spectra. They are appreciably soluble in many organic solvents such as lower alkanols, acetone, ethyl acetate, and the like. They are, however, generally insoluble in water. The compounds of this invention are organic bases and thus are capable of forming acid-addition and quaternary ammonium salts with a variety of organic and inorganic salt-forming reagents. Thus, acid-addition salts, formed by admixture of the organic free base with one equivalent of an acid, suitably in a neutral solvent, are formed with such acids as sulfuric, phosphoric, hydrochloric, hydrobromic, sulfamic, citric, maleic, fumaric, tartaric, acetic, benzoic, gluconic, ascorbic, and related acids. In like manner, quaternary ammonium salts may be formed by reaction of the free bases with a variety of organic esters of sulfuric, hydrohalic and aromatic sulfonic acids. The organic reagents employed for quaternary ammonium salt formation are preferably lower alkyl halides. However, other organic reagents are suitable for quaternary ammonium salt formation and may be selected from among a diverse class of compounds including benzyl chloride, phenethyl chloride, naphthylmethyl bromide, dimethyl sulfate, methyl benzenesulfonate, ethyl toluenesulfonate, allyl chloride, methallyl bromide and crotyl bromide. These acid addition salts are also within the scope of the present invention.

The compounds of the present invention are preferably prepared as illustrated in the following flowsheet:

FLOWSHEET

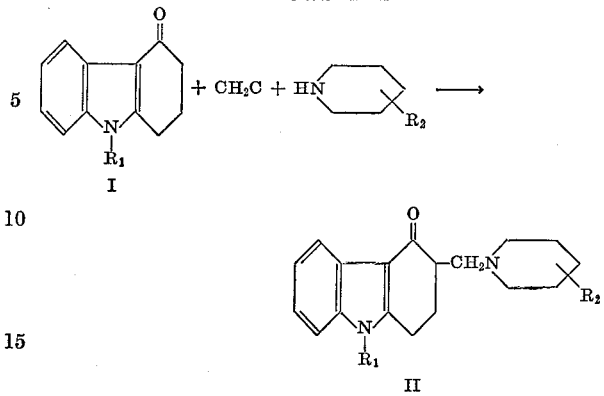

wherein $R_1$ and $R_2$ are as defined hereinbefore. In accordance with this reaction scheme, a 2,3-dihydro-4(1H)-carbazolone (I), is treated with paraformaldehyde and a piperidine to give a 3-piperidinomethylene-2,3-dihydro-4(1H)-carbazolone (II). The reaction may be conducted in a solvent such as methanol, ethanol, tetrahydrofuran, dioxane, and the like. Catalysis with mineral acids such as hydrogen chloride, hydrogen bromide and the like, is beneficial. The reaction is preferably conducted at a temperature of from 25° C. to 100° C. in tetrahydrofuran containing 5–10% of a hydroxylic solvent such as ethanol in the presence of hydrogen chloride. The piperidines useful in the reaction may be, for example, 4-methylpiperidine, 4-ethylpiperidine, 3-methylpiperidine, 3-propylpiperidine, 2-methylpiperidine, 2-butylpiperidine, 4-phenylpiperidine and the like.

The compounds of the present invention are physiologically active on the central nervous system. They show activity as tranquilizers at non-toxic doses. A useful test for tranquilizer activity consists of measuring the reduction of spontaneous motor activity in animals by means of an actophotometer (a photoelectric device for quantitatively measuring locomotor activity). Graded doses of the active compounds prepared by the process of this invention are administered to groups of mice, and the effective dosage range for a significant reduction of motor activity (a measure of tranquilization) compared to control groups is established. The use of reduced motor activity as a measure of tranquilizing activity has been described by W. D. Gray, A. C. Osterberg and C. E. Rauh, Archives Internationales et de Therapie, vol. 134, p. 198 (1961), and W. J. Kinnard and C. J. Carr, Journal of Pharmacology and Experimental Therapeutics, vol. 121, p. 354 (1957).

The effective dose that causes a 50% reduction in motor activity ($MDD_{50}$), expressed in milligrams per kilogram of body weight, of some typical compounds is set forth in Table I below.

TABLE I

| Compound: | $MDD_{50}$ (mg./kg.) |
|---|---|
| 2,3-dihydro-3 - (1-piperidinomethyl)-4(1H)carbazolone | 6.8 |
| 2,3-dihydro-9-methyl-3 - (1-piperidinomethyl)-4(1H)carbazolone | 16 |
| 2,3-dihydro - 3 - (3-methyl-1-piperidinomethyl)-4(1H)carbazolone | 2 |
| 2,3-dihydro-9-methyl-3 - (3-methyl-1-piperidinomethyl)-4(1H)carbazolone | 18 |

The following examples describe in greater detail the preparation of the novel substituted piperidinomethylenedihydrocarbazolones of the present invention.

EXAMPLE 1

Preparation of 2,3-dihydro-3-(1-piperidinomethyl)-4-(1H)carbazolone

A mixture of 1.00 g. (5.5 mmoles) of 2,3-dihydrocarbazol-4(1H)-one [G. R. Clemo and D. G. I. Felton, J. Chem. Soc., 700 (1951)], 510 mg. (6.0 mmoles) of piperidine and 210 mg. (6.0 mmoles) of paraformaldehyde in 100 ml. of tetrahydrofuran is treated with 5 ml. of ethanolic hydrogen chloride and heated at reflux temperature for 1 hour. An additional 510 mg. (6.0 mmoles) of piperidine and 210 mg. (6.0 mmoles) of paraformaldehyde is added and heating is continued for 16 hours. The solution is evaporated, and the residue is partitioned between ethyl acetate and 20% acetic acid. The acid layer is separated, washed with ether, and rendered alkaline with ammonium hydroxide to furnish 550 mg. of white powder. Crystallization from acetone-hexane gives 2,3-dihydro-3-(1-piperidinomethyl) - 4-(1H)carbazolone.

EXAMPLE 2

Preparation of 2,3-dihydro-3-(4-methyl-1-piperidinomethyl)-4(1H)carbazolone

A mixture of 3.00 g. (15.5 mmoles) of 2,3-dihydrocarbazol-4(1H)-one, 630 mg. of paraformaldehyde and 1782 mg. (18.0 mmoles) of 4-methylpiperidine in 300 ml. of tetrahydrofuran is treated with 15 ml. of ethanolic hydrogen chloride. When the procedure of Example 1 is followed, 2,3-dihydro-3-(4-methyl-1-piperidinomethyl)-4(1H)carbazolone, melting point 178–181° C. is obtained.

EXAMPLE 3

Preparation of 2,3-dihydro-3-(3-methyl-1-piperidinomethyl)-4(1H)carbazolone

A mixture of 1.00 g. (5.5 mmoles) of 2,3-dihydrocarbazol-4(1H)-one, 210 mg. of paraformaldehyde and 594 mg. (6.0 mmoles) of 3-methylpiperidine in 100 ml. of tetrahydrofuran is treated with 5 ml. of ethanolic hydrogen chloride. Using the procedure of Example 1, 2,3-dihydro-3-(3-methyl-1-piperidinomethyl - 4(1H)carbazolone, melting point 173–176° C. is obtained.

EXAMPLE 4

Preparation of 2,3-dihydro-9-methyl-3-piperidinomethyl-4(1H)carbazolone

A solution of 6.00 g. of 2,3-dihydro-9-methyl-4(1H)carbazolone [J. A. Ballantine, C. B. Barret, R. J. S. Beer, B. G. Boggiano, S. Eardley, B. E. Jennings, and A Robertson, J. Chem. Soc., 2227 (1957)], 4.25 g. piperidine hydrochloride and 1.20 g. of paraformaldehyde in 500 ml. of absolute alcohol is heated at reflux for 2 hours. An additional charge of 1.5 g. of piperidine hydrochloride and 1.0 g. of paraformaldehyde is added and heating continued for another 6 hours. The solvents are evaporated and the residue is treated with 200 ml. of 25% acetic acid and washed with ethyl acetate. The aqueous layer is rendered alkaline with 10% sodium hydroxide and extracted with ethyl acetate, washed with water, dried and evaporated. Crystallization of the crude product from acetone-hexane gives 3.5 g. (40%) of colorless crystals, melting point 134–136° C. Crystallization from the same solvents raises the melting point to 136–137° C.

EXAMPLE 5

Preparation of 2,3-dihydro-9-methyl-3-[(3-methylpiperidino)methyl]-4(1H)carbazolone A solution of 3.0 g. (15 mmol of 2,3-dihydro-9-methyl-4(1H)carbazolone, 2.2 g. (16 mmol) of 3-methylpiperidine hydrochloride and 600 mg. (20 mmol) of paraformaldehyde is heated at reflux for 6 hours. Another charge of 600 mg. of paraformaldehyde is added and heating is continued for an additional 18 hours. The mixture is worked up as described for Example 1. Crystallization of the crude product from acetone gives 600 mg. (13%) of colorless crystals, melting point 112–115° C. Recrystallization from acetone-hexane raises the melting point to 118–121° C.

EXAMPLE 6

Preparation of 2,3-dihydro-9-methyl-3-[4-methylpiperidino)methyl]-4(1H)-carbazolone A solution of 3.0 g. (15 mmol) of 2,3-dihydro-9-methyl-4(1H)-carbazolone, 2.2 g. (16 mmol) of 4-methylpiperidine hydrochloride and 600 mg. (20 mmol) of paraformaldehyde in 200 ml. of ethanol is heated at reflux for 20 hours. The mixture is worked up as described in Example 1. Evaporation of the solvent gives 2.3 g. (49%) of white solid, melting point 135–140° C. Recrystallization from acetone-hexane gives the analytical sample, melting point 146–148° C.

EXAMPLE 7

Preparation of 2,3-dihydro-3-(4-phenyl-1-piperidinomethyl)-4(1H)carbazolone

A mixture of 1.00 g. (5.5 mmoles) of 2,3-dihydro-4(1H)carbazolone, 210 mg. of paraformaldehyde and 966 mg. (6.0 mmoles) of 4-phenylpiperidine in 100 ml. of tetrahydrofuran is treated with 5 ml. of ethanolic hydrogen chloride. When the procedure of Example 1 is followed, 2,3-dihydro-3-(4 - phenyl - 1-piperidinomethyl)-4(1H)carbazolone is obtained.

We claim:
1. A piperidinomethylene dihydrocarbazolone of the formula:

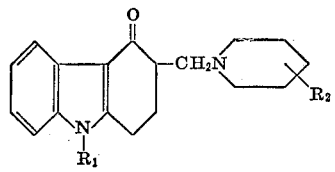

wherein $R_1$ is selected from the group consisting of hydrogen and lower alkyl ($C_1$–$C_4$) and $R_2$ is selected from the group consisting of hydrogen, lower alkyl ($C_1$–$C_4$) and phenyl..

2. The piperidinomethylene dihydrocarbazolone according to claim 1: 2,3-dihydro 3-(1-piperidinomethyl)-4(1H)carbazolone.

3. The piperidinomethylene dihydrocarbazolone according to claim 1: 2,3-dihydro-3-(4-methyl-1-piperidinomethyl)-4(1H)carbazolone.

4. The piperidinomethylene dihydrocarbazolone according to claim 1: 2,3-dihydro3(3-methyl-1-piperidinomethyl)-4(1H)carbazolone.

5. The piperidinomethylene dihydrocarbazolone according to claim 1: 2,3-dihydro-9-methyl-3-piperidinomethyl-4(1H) carbazolone.

6. The piperidinomethylene dihydrocarbazolone according to claim 1: 2,3-dihydro-9-methyl-3-[(3-methylpiperidino)methyl]-4(1H)carbazolone.

7. The piperidinomethylene dihydrocarbazolone according to claim 1: 2,3-dihydro-9-methyl-3-[(4-methylpiperidino)methyl]-4(1H)carbazolone.

8. The piperidinomethylene dihydrocarbazolone according to claim 1: 2,3-dihydro-3-(4-phenyl-1-piperidinomethyl)-4-(1H)carbazolone.

References Cited

UNITED STATES PATENTS 3,634,420  1/1972  Littell et al. _____ 260—247.5 R

FOREIGN PATENTS 1,108,578  4/1968  Great Britain _____ 260—293.61

OTHER REFERENCES

Schoen et al.: Chem. Abstract 71: 30356d (1969); abstract of S. African 67/04, 863, Feb. 14, 1968.

HENRY R. JILES, Primary Examiner

G. T. TODD, Assistant Examiner

U.S. Cl. X.R.

424—267